United States Patent
Konen et al.

(10) Patent No.: US 6,942,197 B2
(45) Date of Patent: Sep. 13, 2005

(54) FISH TAPE HANDLE WITH RETENTION FEATURE

(75) Inventors: Bruce P. Konen, Aurora, IL (US); Benjamin D. Swedberg, Sycamore, IL (US)

(73) Assignee: Ideal Industries, Inc., Sycamore, IL (US)

( * ) Notice: Subject to any disclaimer, the term of this patent is extended or adjusted under 35 U.S.C. 154(b) by 139 days.

(21) Appl. No.: 10/665,202

(22) Filed: Sep. 19, 2003

(65) Prior Publication Data

US 2005/0062029 A1 Mar. 24, 2005

(51) Int. Cl.$^7$ ............................................. B65H 59/00
(52) U.S. Cl. ................................................. 254/134.3 FT
(58) Field of Search ........................... 254/134.3 FT, 254/134.3 R, 403, 411, 433; 242/96, 71.1; 15/104.33, 104.31

(56) References Cited

U.S. PATENT DOCUMENTS

| | | |
|---|---|---|
| 2,743,884 A | 5/1956 | Briggs |
| 2,750,152 A | 6/1956 | Schinske |
| RE24,250 E | 12/1956 | Waldschmidt |
| 2,788,952 A | 4/1957 | Axelsen |
| 2,913,222 A | 11/1959 | Kuzara |
| 2,928,656 A | 3/1960 | Lindsey |
| 2,969,953 A | 1/1961 | Shaw, Jr. |
| 3,067,984 A | 12/1962 | Linden |
| 3,355,123 A | 11/1967 | Schinske |
| 3,424,435 A | 1/1969 | Niemann |
| 3,528,644 A | 9/1970 | Scott |
| 3,533,599 A | 10/1970 | Hindenburg |
| 3,549,127 A | 12/1970 | Niemann |
| 3,568,947 A | 3/1971 | Oprins |
| 3,582,044 A | 6/1971 | Gardner |
| 3,601,330 A | 8/1971 | Minobe |
| 4,573,829 A | 3/1986 | Keene et al. |
| 5,056,731 A | 10/1991 | Koehn |
| 5,106,056 A | 4/1992 | Crates et al. |
| 5,110,092 A | 5/1992 | Blaha et al. |
| 5,201,495 A | 4/1993 | Crates et al. |
| 5,423,516 A | 6/1995 | Blaha |
| 5,484,135 A | 1/1996 | Golden et al. |
| 5,505,432 A | 4/1996 | Noonan |
| D398,870 S | 9/1998 | Konen et al. |

*Primary Examiner*—Robert C. Watson
(74) *Attorney, Agent, or Firm*—Cook, Alex, McFarron, Manzo, Cummings & Mehler, Ltd.

(57) ABSTRACT

A fish tape assembly has a handle slidably mounted on a case formed by a pair of case halves. The periphery of the case has a gap formed therein. The handle has an exterior grip and shoe with a web extending from the shoe through the gap in the case to an interior belt. The belt is continuous around the full circumference of the case to provide increased strength and a shield that precludes a fish tape inside the case from inadvertently popping out through the gap. The handle has a passageway for the tape. The passageway includes a pair of laterally disposed posts that prevent the tape from popping out of the passageway.

9 Claims, 4 Drawing Sheets

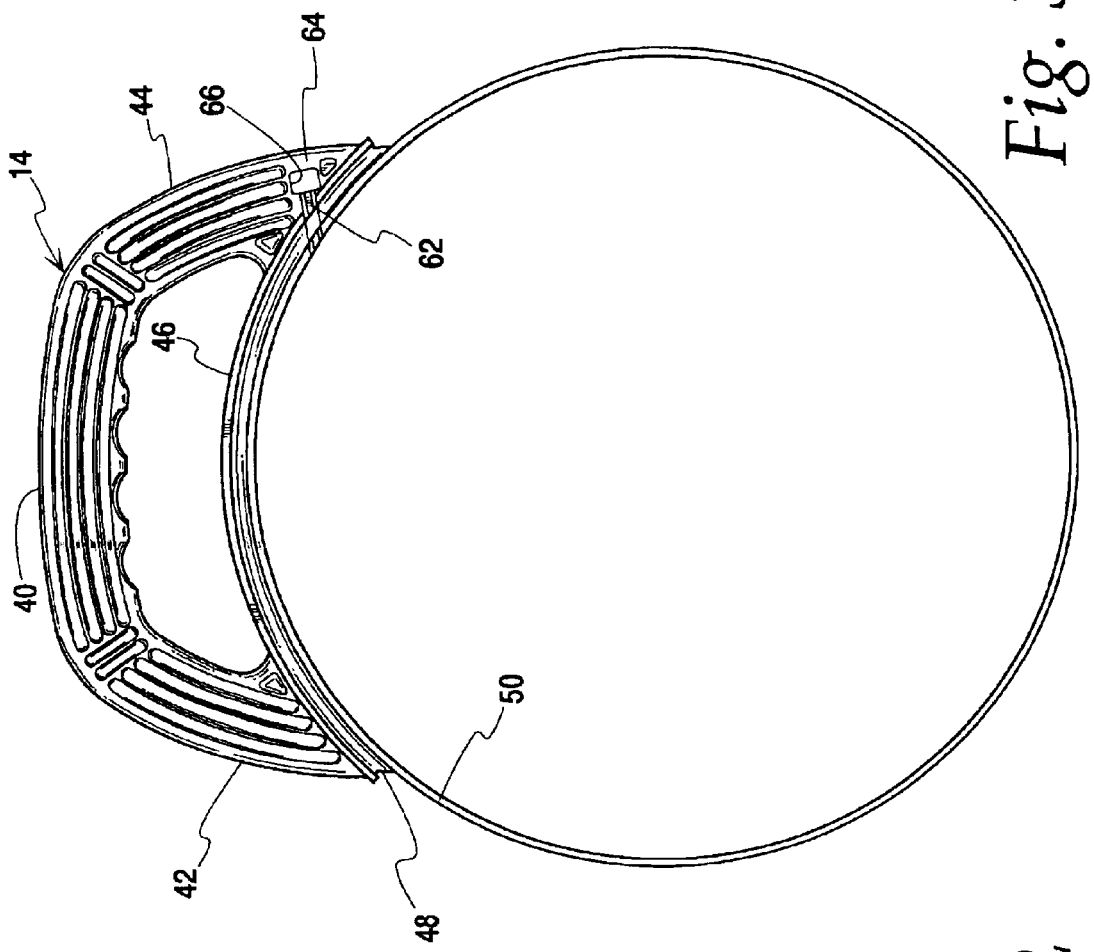
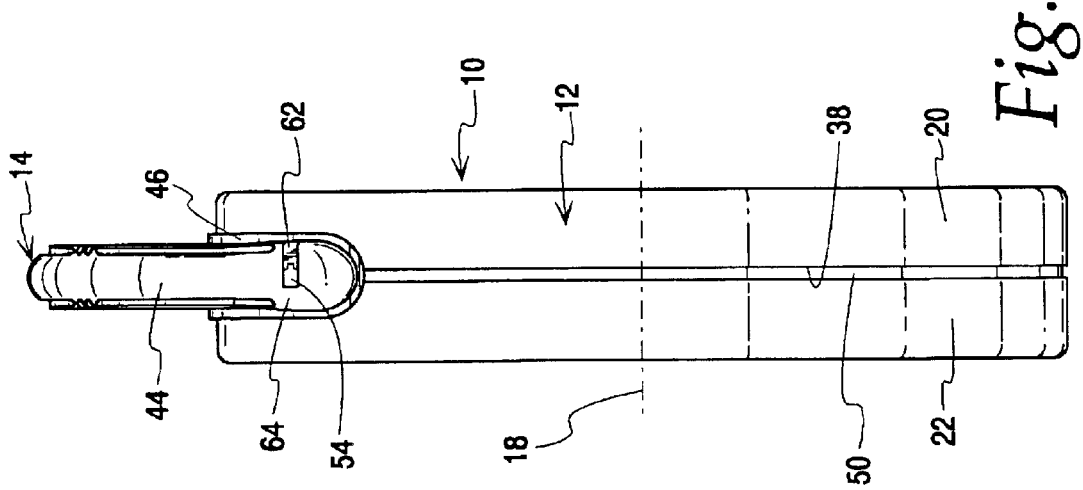

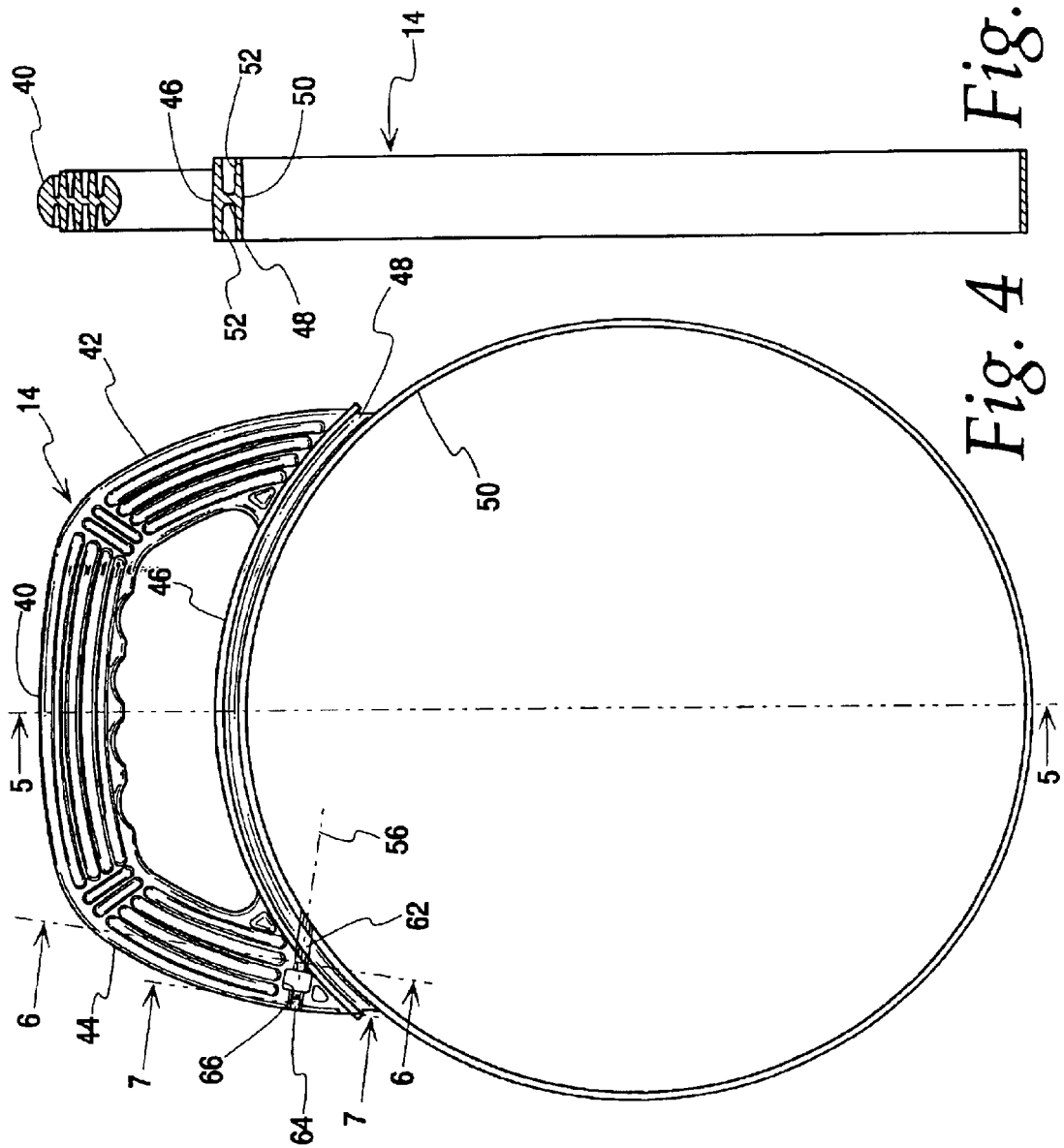
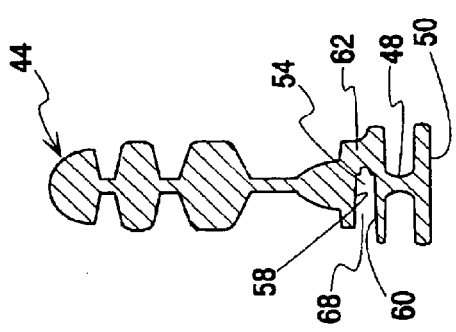
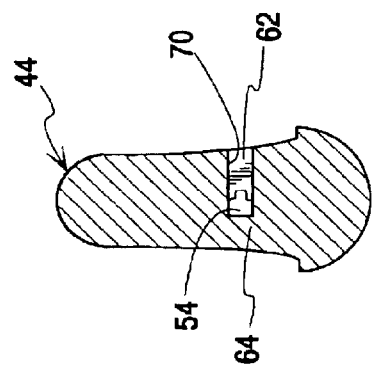

FISH TAPE HANDLE WITH RETENTION FEATURE

BACKGROUND OF THE INVENTION

The present invention relates generally to an electrician's fish tape assembly. More specifically, the invention relates to a fish tape housing and an improved handle therefor.

A fish tape is an electrician's tool which is used to install wires in a conduit. The fish tape itself is an elongated member made of tempered spring steel, stainless steel, nylon, fiberglass with a nylon jacket, or multi-stranded steel wire. The fish tape is rigid enough to be pushed through a conduit yet flexible enough to bend around corners or curves in the conduit. After the tape has been "fished" or threaded through a conduit, a wire or cable is attached to the end of the fish tape and the tape is pulled back through the conduit, drawing the wire with it to install the wire in the conduit.

Fish tapes are supplied in lengths ranging from 25 to 240 feet. Due to the length of the fish tape, it is usually coiled for manageability. However, the natural resilience of the material makes the coil unruly. The material at all times wants to escape the confines of the coil. That is, it seeks to return to its natural straight condition and thus wants to "spring out" of its coiled condition. Accordingly, the fish tape must be housed in some manner to maintain it in a coiled condition until it is ready to be used.

Traditionally a housing or case of some sort has been used to constrain the coils of the fish tape within a chamber formed within the case walls. The case's walls confine the coils and prevent their natural release. An opening for paying the tape into and out of the housing is provided. In some models, the housing has a circular case formed of two halves with a slot defined where the halves meet. A handle travels around the periphery of the case, widening the slot at the location of the handle to direct the tape's exit from and entry into the case. In fish tapes that contain a traveling handle mechanism, the handle projects from the case and can be rotated about its circumference. When the case and handle are revolved relative to each other, the tape will be payed into or out of the case. In many prior art housing designs, the handle rotates on an inner track, or wall, as it rotates about the housing. A slot in the handle, open on one side, permits the tape to extend through the handle.

Traditional housing and handle members present a number of problems. The case is usually made up of two halves with a gap between the halves. The halves are joined in a manner that intentionally permits widening of the gap at the handle. However, the case halves may also unintentionally separate when dropped or under otherwise subjected to extreme conditions. When that happens the tape can escape its confines. The possibility of the tape "springing out" of the case or handle presents a danger to users, particularly where the tape is of a material such as steel. The tape is particularly prone to popping out of its slot in the handle because the slot is fully open on one side of the handle. This forces the user to rethread the tape back into the handle slot before further use can be made.

SUMMARY OF THE INVENTION

The present invention is a fish tape housing having a handle grip and a generally annular case. The case has two halves each including a radial wall and inner and outer axial half walls. The ends of the axial half walls are in facing relation. The outer axial half walls define a slot between them. Screws hold the case halves together. Together the radial walls and axial half walls define a fish tape receiving chamber. A handle grip has a central portion and two legs which are connected by an arcuate shoe. The shoe rides on the exterior surface of the outer half walls. A web on the underside of the shoe extends through the slot to the interior of the case. A continuous hoop or belt is attached to the web. The belt has a outside diameter slightly less than the inside diameter of the outer half walls. The continuous belt allows users of fish tapes to employ the device without fear of the tape escaping the confines of the housing, should the annular walls separate. The belt constrains the tape within the chamber, even under extreme conditions such as the fish tape being dropped from the top of a ladder, or the like.

In addition, the fish tape housing of the present invention provides an improved handle design. The handle has a passageway defined by top and bottom walls and first and second posts. The passageway has a throat adapted to receive the tape therein. The throat defines a longitudinal axis. The first post is disposed laterally of the longitudinal axis on a first side while the second post is disposed laterally of the longitudinal axis on a second side. Thus, the first and second posts are laterally spaced from one another such that a tape in the passageway is restrained on both sides and cannot pop out of the passageway. The first and second posts are also longitudinally spaced from one another to define a laterally-directed port. Installation of the tape in the case is achieved by passing an end portion of the tape through the port and then rotating the coil of tape ninety degrees to place the coil into an open case half. This construction obviates the need to thread the entire tape through the handle passageway.

BRIEF DESCRIPTION OF THE DRAWINGS

FIG. 2 is an end elevation view of the fish tape assembly.

FIG. 3 is a rear elevation view of the handle and its continuous belt.

FIG. 4 is a front elevation view of the handle and its continuous belt.

FIG. 5 is a section taken along line 5—5 of FIG. 4.

FIG. 6 is a section taken along line 6—6 of FIG. 4, shown on an enlarged scale.

FIG. 7 is a section taken along line 7—7 of FIG. 4, shown on an enlarged scale.

DETAILED DESCRIPTION OF THE INVENTION

Figure 1:
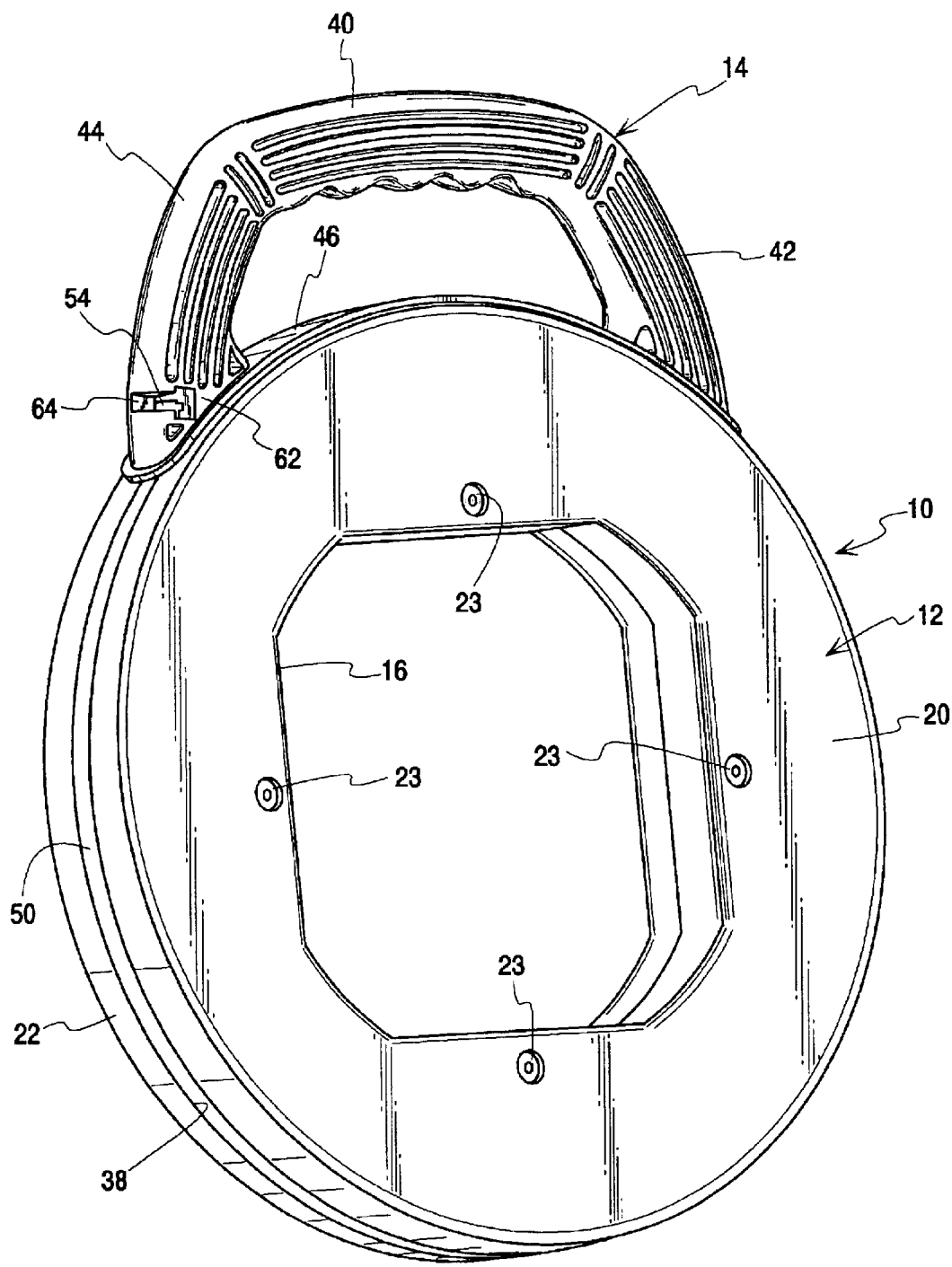
FIG. 1 is a perspective view of the fish tape assembly of the present invention, with the fish tape removed for clarity.

The fish tape assembly of the present invention is shown generally at 10 in FIGS. 1 and 2. The fish tape assembly 10 includes a generally circular case 12 and a handle 14. The case has a central opening 16 and defines an axis 18. The case 12 is made of first and second case halves 20 and 22. The case may be made of ABS, although other materials are possible. The halves are held together by four screws, shown schematically at 23, which extend through screw holes in one case half and into mounting posts in the other. For reference purposes the face of the fish tape assembly seen in FIG. 1 will be considered the front of the assembly.

Figure 9:
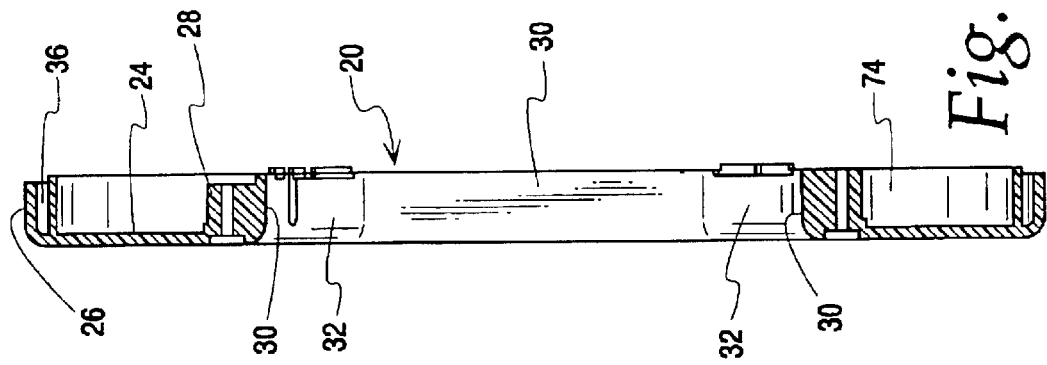
FIG. 9 is a section taken along line 9—9 of FIG. 8.
Figure 8:
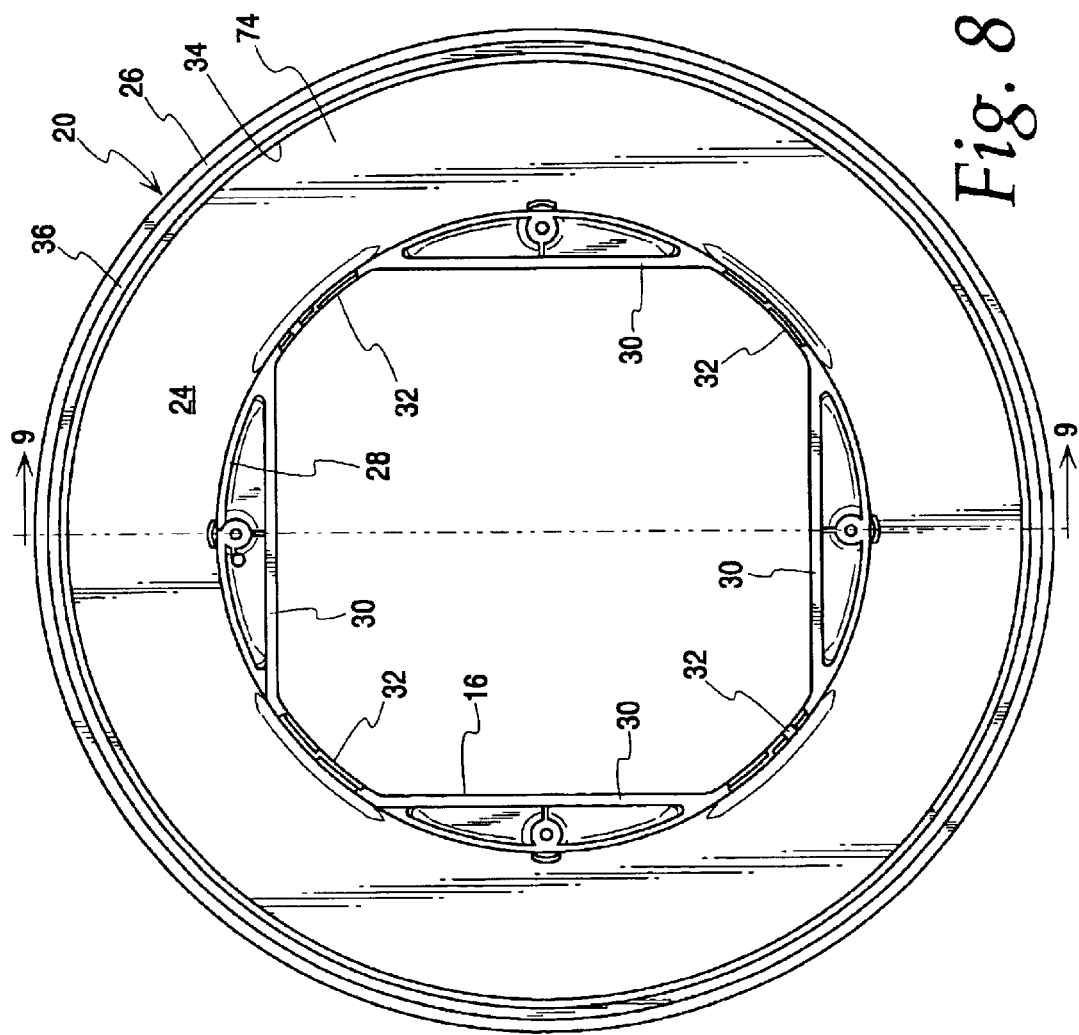
FIG. 8 is a front elevation of a case half, looking at the interior of the half.

Preferably the halves are identical so only half 20 will be described in connection with FIGS. 8 and 9. Like parts will be given like reference numerals in the two halves. The case half includes a radial wall 24 in the shape of a flat ring. An outer annular half wall 26 is attached to the outside edge of the radial wall 24. The annular half wall 26 is perpendicular to the radial wall 24 and thus extends in an axial direction. Similarly, an inner annular half wall 28 is attached to the inside edge of the radial wall 24 and extends axially therefrom. Four chordal walls 30 are spaced about the central opening 16. The chordal walls 30 are connected by corner walls 32. A pinch ring half wall 34 is attached to the radial wall 24, just inside of the outer annular half wall 26. Together the pinch ring half wall 34 and the outer annular half wall 26 define a guideway 36 between them.

It will be noted that the axial extent or height of the inner annular half wall 28 and the pinch ring half wall 34 is slightly greater than that of the outer annular half wall 26. Thus, while the inner half walls 28 of mating case halves will meet, the outer half walls 26 will have a gap or slot 38 between them. The pinch ring walls 34 of mating case halves will meet one another except in the vicinity of the location where the fish tape extends out of the case. The pinch ring walls will flex at this location to allow passage of the tape. Further details of the case halve's construction are shown and described in U.S. patent application Ser. No. 10/173,092, filed Jun. 17, 2002, the disclosure of which is incorporated herein by reference.

The handle 14 is shown in FIGS. 3–5. The handle may be made of polypropylene or other suitable material. The handle 14 has a grip that includes a central portion 40, a first leg 42 and a second leg 44. The legs are connected to an arcuate shoe 46. The inner radius of the shoe is slightly larger than the outside diameter of the outer half walls 26 so that the shoe is disposed to slide on the exterior periphery of the case. A web 48 is attached to the underside of the shoe 46. The web 48 lies in a radial plane, i.e., the web is generally perpendicular to the shoe. The web is arranged to extend through the gap 38 when the fish tape case is assembled. At its inner end the web 48 attaches to a circular belt or hoop 50. The outer diameter of the belt is slightly less than the inside diameter of the outer half walls 26 so that the belt is disposed to slide on the interior periphery of the case, in the guideway 36. Thus, as best seen in FIG. 5, the belt 50 and the shoe 46 define a pair of grooves 52 each of which receives one of the outer half walls 26. There is enough clearance of the outer half walls 26 in the grooves 52 to permit the handle 14 to slide around the periphery of the case halves.

It will be noted that the belt 50 is circular and continuous for the full 360° around the interior of the guideway 36. It is important that there is no discontinuity in the belt because that would diminish its hoop strength and subject the handle to binding inside the case. The belt also is wide enough to span the width of the gap 38 and any separation of the pinch ring walls 34. Thus, the belt 50 fully shields the gap and prevents any coils of the tape from inadvertently popping through the pinch ring and the gap.

As seen in FIGS. 1 and 2, a passageway 54 extends through a portion of the belt 50, web 48, shoe 46 and the base of the second leg 44. This passageway defines a longitudinal axis 56 (FIG. 4) and permits the fish tape (not shown) to enter and exit the case. As seen in FIGS. 6 and 7, the passageway is defined by a top wall 58 and a bottom wall 60 formed primarily in the base of the leg 44. The passageway 54 is further defined by first and second posts 62 and 64. The posts preferably extend between the top and bottom walls 58, 60 and are connected to each of these walls. The posts are disposed laterally of the passageway axis. That is, as seen in FIGS. 3 and 4, the first post 62 is located toward the front side of the fish tape assembly while the second post 64 is located toward the rear side of the assembly. This arrangement permits the tape to pass between the posts, i.e., there is one post on either side of the tape. Accordingly, the tape is trapped between the posts and cannot pop out of the passageway, even upon encountering abnormal conditions such as the fish tape assembly being dropped.

It will be further noted in FIGS. 3 and 4 that the posts 62, 64 are spaced from one another in a direction parallel to the passageway axis. That is to say the first post 62 is closer to the interior of the case while the second post 64 is closer to the exterior of the case. This longitudinal separation of the posts defines an aperture 66 between the posts 62 and 64. The longitudinal separation of the posts is preferably greater than the lateral separation of the posts. Thus, the width of the aperture 66, as seen in FIGS. 3 and 4, is greater than the cross sectional width of the passageway 54, as seen in FIG. 2.

Another way to visualize the passageway is to consider that the posts 62, 64 define two open channels 68 (FIG. 6) and 70 (FIG. 7). The first channel 68 is laterally adjacent the first post 62 and is open toward the rear of the case. The second channel 70 is laterally adjacent the second post 64 and is open toward the front of the case. These channels can be considered to overlap one another at the middle of the passageway to form the aperture 66.

The size relationship between the aperture and passageway greatly simplifies installation of the coiled fish tape into the case. The fish tape cannot be threaded through the passageway because the end of the tape will have an eyelet or other enlarged connector affixed thereto for purposes of attaching wires to be pulled. The eyelet will not fit through the passageway. It is not desirable to enlarge the passageway to accommodate the eyelet because that would allow the tape to be wound fully inside the case, with the result that the end portion of the tape and the eyelet would be inaccessible for the next use. Also, a passageway large enough to pass the eyelet would provide too much play of the tape in the passageway and it would weaken the handle. Furthermore, the tapes wear out and have to replaced in the field. Replacement tapes must have the eyelet already in place when they are installed in a case. The described arrangement of the posts allows installation of a tape with a pre-formed eyelet into a passageway that accommodates the tape but not the eyelet.

There are at least two alternative procedures for assembling a complete fish tape. In a first method a coiled fish tape is held with the plane of its coils generally perpendicular to the plane of the handle. The fish tape's eyelet and a short end portion of the tape is inserted through the aperture. This insertion must be from what is referred to herein as the rear side of the handle, that is, the side shown in FIG. 2. In other words, the second post 64 must be the first one the eyelet passes upon insertion through the aperture. This orientation will then permit the plane of the coiled fish tape to be rotated ninety degrees with respect to the handle so the end portion of the tape will then reside in the open channels 68, 70 of the passageway with the eyelet outside the handle and the coils within the belt 50. Then the assembled handle and fish tape can be placed into one of the case halves 20, 22. Finally, any temporary restraints on the fish tape coils are removed and the second case half is screwed to the first one. The pinch ring walls 34 will engage the portion of the fish tape leading to the passageway, with those walls flexing sufficiently to accommodate the tape between them.

In the second assembly alternative, the handle 14 is placed in a case half 20 prior to introduction of the fish tape. In this instance a case half 20 is laid flat on a work surface and the handle 14 is laid into the open side of the case half. One edge of the belt 50 is placed in the guideway 36 of the one case half. It is important that the handle is placed with the rear side of the handle up, or toward the open side of the case half. In other words, the first post 62 must be closest to the radial wall 24 of the case half. This orientation of the handle will permit installation of the coiled fish tape. An end portion of the fish tape is uncoiled just enough to permit it to be inserted through the aperture 66 between the posts 62 and 64. The plane of the fish tape coil should be generally perpendicular to the plane of the radial wall 24 during such insertion. Then the fish tape coil is rotated ninety degrees to lay the coil within a fish tape receiving chamber 74 defined by the radial wall 24, the inner half walls 28 and the pinch ring walls 34. The end portion of the tape will then be disposed in the open channels 68, 70, between the posts, with the eyelet outside of the passageway. Once the fish tape is thus installed, any temporary restraining ties on its coils can be removed and the second case half can be installed on the first half.

When the two case halves 20, 22 are assembled the free edges of the inner annular half walls 28 and the chordal walls 30 are placed adjacent one another. Screws 23 hold the halves together. The radial walls 24 together with the inner annular half walls 28 and the pinch ring walls 34 define the fish tape receiving chamber 74 (FIG. 9). The handle's web 48 is located between the mating outer annular half walls 26. The adjacent free edges of the outer half walls 26 are separated slightly to define the slot or gap 38 therebetween. The belt 50 is disposed in the guideway 36 while the shoe 46 is on the outside of the case. The belt, web and shoe are sized such that the handle is engageable with the outer annular wall and is slidable therealong.

While a preferred form of the invention has been shown and described, it will be realized that alterations and modifications may be made thereto without departing from the scope of the following claims.

We claim:

1. A fish tape assembly including a case adapted to receive a fish tape therein, a handle slidably mounted on the case, the handle having a top wall, a bottom wall, a first post and a second post which collectively define a passageway through the handle, the passageway being adapted to receive a fish tape and defining a longitudinal axis, the first post being disposed laterally of said axis in a first direction and the second post being disposed laterally of said axis in a second direction such that a fish tape extending through the passageway is bounded on both sides of the fish tape by one of the said posts.

2. The fish tape assembly of claim 1 further characterized in that the first and second posts are longitudinally spaced from one another to define an aperture therebetween.

3. The fish tape assembly of claim 1 wherein the case is formed by first and second case halves having facing outer annular walls that are spaced from one another to define a gap therebetween and wherein the handle further comprises an arcuate shoe, a grip attached to the shoe, a web attached to the shoe on the opposite side from the grip, the web extending through the gap to the interior of the case, and a belt attached to the web in the interior of the case.

4. The fish tape assembly of claim 3 wherein the passageway includes an opening in the shoe and an opening in the belt.

5. The fish tape assembly of claim 3 wherein the grip comprises first and second legs joined by a central portion and the passageway is formed in one of said legs.

6. A fish tape assembly having a case with a fish tape receiving chamber formed therein and a gap defined in the case, a handle slidably mounted on the case and having a passageway aligned with the gap such that a fish tape can extend through the gap and passageway, the passageway being defined by top and bottom walls formed in the handle and by first and second posts extending from one of said walls toward the other, the walls and posts being arranged to surround a fish tape in the passageway on all sides of the fish tape.

7. The fish tape assembly of claim 6 further characterized in that the first and second posts are spaced from one another to define an aperture therebetween.

8. A fish tape assembly having a case with a fish tape receiving chamber formed therein and a gap defined in the case, a handle slidably mounted on the case and having a passageway aligned with the gap such that a fish tape can extend through the gap and passageway, the passageway including first and second channels, one of which is open toward a front side of the case and the other of which is open toward a rear side of the case.

9. The fish tape assembly of claim 8 further characterized in that the first and second channels overlap with one another to define an aperture which extends fully through the handle.

* * * * *